United States Patent
Wang et al.

(10) Patent No.: US 11,968,400 B2
(45) Date of Patent: Apr. 23, 2024

(54) VIDEO CODING BITSTREAM EXTRACTION WITH IDENTIFIER SIGNALING

(71) Applicant: Huawei Technologies Co., Ltd., Shenzhen (CN)

(72) Inventors: Ye-Kui Wang, San Diego, CA (US); FNU Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/568,531

(22) Filed: Jan. 4, 2022

(65) Prior Publication Data

US 2022/0132170 A1   Apr. 28, 2022

Related U.S. Application Data

(63) Continuation of application No. PCT/US2020/037780, filed on Jun. 15, 2020.

(60) Provisional application No. 62/870,892, filed on Jul. 5, 2019.

(51) Int. Cl.
*H04N 19/70* (2014.01)
*H04N 19/172* (2014.01)

(52) U.S. Cl.
CPC .......... *H04N 19/70* (2014.11); *H04N 19/172* (2014.11)

(58) Field of Classification Search
CPC ............................ H04N 19/70; H04N 19/172
See application file for complete search history.

(56) References Cited

U.S. PATENT DOCUMENTS

| | | | |
|---|---|---|---|
| 9,414,085 B2 | 8/2016 | Samuelsson et al. |
| 9,918,091 B2 | 3/2018 | Wang et al. |
| 10,284,867 B2 | 5/2019 | Hannuksela |
| 2005/0158027 A1 | 7/2005 | Horentrup et al. |
| 2008/0170615 A1 | 7/2008 | Sekiguchi et al. |

(Continued)

FOREIGN PATENT DOCUMENTS

| | | |
|---|---|---|
| CN | 104396255 A | 3/2015 |
| RU | 2400941 C1 | 9/2010 |

(Continued)

OTHER PUBLICATIONS

Document: JVET-Q0119-v1, Wang, Y.K., "AHG12:Cleanups on signalling of subpictures, tiles, and rectangular slices," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.

(Continued)

*Primary Examiner* — Jerry T Jean Baptiste
(74) *Attorney, Agent, or Firm* — Conley Rose, P.C.

(57) ABSTRACT

A video coding mechanism is disclosed. The mechanism includes receiving an extracted bitstream that is a result of a sub-bitstream extraction process from an input bitstream containing a set of sub-pictures. The extracted bitstream contains only a subset of the sub-pictures of the input bitstream to the sub-bitstream extraction process. A flag from the extracted bitstream is set to indicate that sub-picture information related to the subset of the sub-pictures is present in the extracted bitstream. One or more sub-picture identifiers (IDs) for the subset of the sub-pictures are obtained based on the flag. The subset of the sub-pictures is decoded based on the sub-picture IDs.

20 Claims, 10 Drawing Sheets

(56) References Cited

U.S. PATENT DOCUMENTS

| | | |
|---|---|---|
| 2011/0228848 A1 | 9/2011 | Dvir et al. |
| 2012/0300839 A1 | 11/2012 | Sze et al. |
| 2014/0003489 A1 | 1/2014 | Hannuksela |
| 2014/0003504 A1 | 1/2014 | Ugur et al. |
| 2014/0003535 A1 | 1/2014 | Haque et al. |
| 2014/0086303 A1 | 3/2014 | Wang |
| 2014/0098896 A1 | 4/2014 | Wang |
| 2015/0131744 A1 | 5/2015 | Samuelsson |
| 2015/0189322 A1 | 7/2015 | He |
| 2016/0381393 A1 | 12/2016 | Tsukuba et al. |
| 2020/0396481 A1* | 12/2020 | Furht .......... H04N 19/159 |
| 2021/0152816 A1* | 5/2021 | Zhang .......... H04N 19/105 |
| 2022/0182681 A1* | 6/2022 | Paluri .......... H04N 19/176 |

FOREIGN PATENT DOCUMENTS

| | | |
|---|---|---|
| RU | 2612577 C2 | 3/2017 |
| WO | 2015102959 A1 | 7/2015 |
| WO | 2018221368 A1 | 12/2018 |

OTHER PUBLICATIONS

International Search Report from a related foreign application, PCT/US2020/037780, filed Jan. 4, 2022, dated Aug. 31, 2020, 3 pages.

Written Opinion from a related foreign application, PCT/US2020/037780, filed Jan. 4, 2022, dated Aug. 31, 2020, 5 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Feb. 2018, 692 pages.

"Line Transmission of Non-Telephone Signals, Video Codec for Audiovisual Services at p x 64 kbits," ITU-T Recommendation H.261, Mar. 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

Bross, et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v8, 400 pages.

Document: JVET-O0453r1, Chang, Y., et al., "AHG12: On rectangular slice signaling," Joint Video Experts Team (JVET)of ITU-T SG 16 WP 3 and ISO/IEC JTC 1/SC 29/WG 1115th Meeting: Gothenburg, SE, Jul. 3-12, 2019, 4 pages.

Document: JVET-O0176, Deshpande, S., "On Tiles, Bricks and Slices," Joint Video Experts Team (JVET)of ITU-T SG 16 WP 3 and ISO/IEC JTC 1/SC 29/WG 1115th Meeting: Gothenburg, SE, Jul. 3-12, 2019, 3 pages.

Document: JVET-O0269-v1, Chen, L., et al., "AHG17: Suggested syntax improvement on PPS," Joint Video Experts Team (JVET)of ITU-T SG 16 WP 3 and ISO/IEC JTC 1/SC 29/WG 1115th Meeting: Gothenburg, SE, Jul. 3-12, 2019, 8 pages.

Document: JVET-N1001-v10, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 407 pages.

C.-Y. Lai et al., "AHG9/AHG12: Bitstream conformance requirements on subpicture ID", JVET-Q0169-v1, Joint Video Experts Team (JVET) of ITU-T SG 16 WP 3 and ISO/IEC JTC 1/SC 291WG 11 17th Meeting: Brussels, BE, Jan. 7-17, 2020, 4 pages.

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 14 pages.

Chen L. et al., "AHG17: [SYS-VVC] Signaling subpicture coded video sequence," Joint Video Experts Team (JVET) of ITU-T SG 16 WP 3 and ISO/IEC JTC 1/SC 29/WG 11, 14th Meeting: Gothenburg, SE, JVET-O0454, Jul. 3-12, 2019, 5 pages.

Chang Y. et al., "AHG12: On Sub-bitstream extraction," Joint Video Experts Team (JVET) of ITU-T SG, 16 WP 3 and ISO/IEC JTC 1/SC 29/WG 11 15th Meeting: Gothenburg, SE, JVET-O0454, Jul. 3-12, 2019, 5 pages.

* cited by examiner

VIDEO CODING BITSTREAM EXTRACTION WITH IDENTIFIER SIGNALING

CROSS-REFERENCE TO RELATED APPLICATIONS

This patent application is a continuation of International Application No. PCT/US2020/037780, filed Jun. 15, 2020 by Ye-Kui Wang, et. al., and titled "Video Coding Bitstream Extraction With Identifier Signaling," which claims the benefit of U.S. Provisional Patent Application No. 62/870,892, filed Jul. 5, 2019 by Ye-Kui Wang, and titled "Handling Signalled Slice Id for Bitstream Extraction," which are hereby incorporated by reference.

TECHNICAL FIELD

The present disclosure is generally related to video coding, and is specifically related to bitstream extraction in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of a decoder, an extracted bitstream that is a result of a sub-bitstream extraction process from an input bitstream containing a set of sub-pictures, the extracted bitstream containing only a subset of the sub-pictures of the input bitstream to the sub-bitstream extraction process; determining, by a processor of the decoder, a flag from the extracted bitstream is set to indicate that sub-picture information related to the subset of the sub-pictures is present in the extracted bitstream; obtaining, by the processor, one or more sub-picture identifiers (IDs) for the subset of the sub-pictures based on the flag; and decoding, by the processor, the subset of the sub-pictures based on the sub-picture IDs.

Some video coding sequences can include pictures that are encoded as a set of sub-pictures. The sub-pictures may be associated with sub-picture IDs that can be used to indicate the location of the sub-pictures relative to the pictures. In some cases, such sub-picture information can be inferred. In such cases, this sub-picture information can be left out of the bitstream to increase coding efficiency. Certain processes may extract a sub-bitstream from a bitstream for independent transmission to an end user. In such a case, the sub-bitstream contains only a sub-set of the sub-pictures that were contained in the original bitstream. While the sub-picture information can be inferred when all sub-pictures are present, such inference may not be possible at a decoder when only a sub-set of the sub-pictures are present. The present example includes mechanisms to prevent coding errors during sub-bitstream extraction. Specifically, if a sub-bitstream is extracted from a bitstream, the encoder and/or splicer include the sub-picture information for at least the sub-set of sub-pictures in the sub-bitstream. Further, the encoder/splicer includes a flag to indicate that the sub-picture information is included in the sub-bitstream. The decoder can read this flag, obtain the correct sub-picture information, and decode the sub-bitstream. Accordingly, the disclosed mechanisms create additional functionality at the encoder and/or decoder by avoiding errors. Further, the disclosed mechanisms may increase coding efficiency by allowing for sub-bitstream extraction rather than transmitting the entire bitstream. This may reduce processor, memory, and/or network resource usage at the encoder and/or decoder.

Optionally, in any of the preceding aspects, another implementation of the aspect provides, further comprising obtaining, by the processor, a length in bits of a syntax element containing the one or more sub-picture IDs.

Optionally, in any of the preceding aspects, another implementation of the aspect provides, wherein the flag, the sub-picture IDs, and the length are obtained from a sequence parameter set (SPS) in the extracted bitstream.

Optionally, in any of the preceding aspects, another implementation of the aspect provides, wherein the flag is a sub-picture information is present flag (subpic_info_present_flag).

Optionally, in any of the preceding aspects, another implementation of the aspect provides, wherein sub-picture IDs are contained in a SPS sub-picture identifier (sps_subpic_id[i]) syntax structure.

Optionally, in any of the preceding aspects, another implementation of the aspect provides, wherein the length is contained in a SPS sub-picture ID length minus one plus one (sps_subpic_id_len_minus1 plus 1) syntax structure.

Optionally, in any of the preceding aspects, another implementation of the aspect provides, wherein the flag is required to be set to one to specify that the sub-picture information is present for a coded layer video sequence (CLVS) and that each picture of the CLVS contains more than one sub-picture when the extracted bitstream is the result of the sub-bitstream extraction process from the input bitstream.

In an embodiment, the disclosure includes a method implemented in an encoder, the method comprising: encoding, by a processor of the encoder, an input bitstream containing a set of sub-pictures; performing, by the processor, a sub-bitstream extraction process on the input bitstream to create an extracted bitstream containing only a subset of the sub-pictures of the input bitstream; encoding into the extracted bitstream, by the processor, one or more sub-picture IDs for the subset of the sub-pictures in the extracted bitstream; setting, by the processor, a flag in the extracted bitstream to indicate that sub-picture information related to the subset of the sub-pictures is present in the extracted bitstream; and storing, by a memory coupled to the processor, the bitstream for communication toward a decoder.

Some video coding sequences can include pictures that are encoded as a set of sub-pictures. The sub-pictures may be associated with sub-picture IDs that can be used to indicate the location of the sub-pictures relative to the pictures. In some cases, such sub-picture information can be inferred. In such cases, this sub-picture information can be left out of the bitstream to increase coding efficiency. Certain processes may extract a sub-bitstream from a bitstream for independent transmission to an end user. In such a case, the sub-bitstream contains only a sub-set of the sub-pictures that were contained in the original bitstream. While the sub-picture information can be inferred when all sub-pictures are present, such inference may not be possible at a decoder when only a sub-set of the sub-pictures are present. The present example includes mechanisms to prevent coding errors during sub-bitstream extraction. Specifically, if a sub-bitstream is extracted from a bitstream, the encoder and/or splicer include the sub-picture information for at least the sub-set of sub-pictures in the sub-bitstream. Further, the encoder/splicer includes a flag to indicate that the sub-picture information is included in the sub-bitstream. The decoder can read this flag, obtain the correct sub-picture information, and decode the sub-bitstream. Accordingly, the disclosed mechanisms create additional functionality at the encoder and/or decoder by avoiding errors. Further, the disclosed mechanisms may increase coding efficiency by allowing for sub-bitstream extraction rather than transmitting the entire bitstream. This may reduce processor, memory, and/or network resource usage at the encoder and/or decoder.

Optionally, in any of the preceding aspects, another implementation of the aspect provides, further comprising encoding, by the processor, a length in bits of a syntax element containing the one or more sub-picture IDs into the extracted bitstream.

Optionally, in any of the preceding aspects, another implementation of the aspect provides, wherein the flag, the sub-picture IDs, and the length are encoded into a SPS in the extracted bitstream.

Optionally, in any of the preceding aspects, another implementation of the aspect provides, wherein the flag is a subpic_info_present_flag.

Optionally, in any of the preceding aspects, another implementation of the aspect provides, wherein sub-picture IDs are contained in a sps_subpic_id[i] syntax structure.

Optionally, in any of the preceding aspects, another implementation of the aspect provides, wherein the length is contained in a sps_subpic_id_len_minus1 plus 1 syntax structure.

Optionally, in any of the preceding aspects, another implementation of the aspect provides, wherein the flag is required to be set to one to specify that the sub-picture information is present for a CLVS and that each picture of the CLVS contains more than one sub-picture when the extracted bitstream is the result of the sub-bitstream extraction process from the input bitstream.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving an extracted bitstream that is a result of a sub-bitstream extraction process from an input bitstream containing a set of sub-pictures, the extracted bitstream containing only a subset of the sub-pictures of the input bitstream to the sub-bitstream extraction process; a determining means for determining a flag from the extracted bitstream is set to indicate that sub-picture information related to the subset of the sub-pictures is present in the extracted bitstream; an obtaining means for obtaining one or more sub-picture IDs for the subset of the sub-pictures based on the flag; a decoding means for decoding the subset of the sub-pictures based on the sub-picture IDs; and a forwarding means for forwarding the subset of the sub-pictures for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: a first encoding means for encoding an input bitstream containing a set of sub-pictures; a bitstream extraction means for performing a sub-bitstream extraction process on the input bitstream to create an extracted bitstream containing only a subset of the sub-pictures of the input bitstream; a second encoding means for encoding into the extracted bitstream one or more sub-picture IDs for the subset of the sub-pictures in the extracted bitstream; a setting means for setting a flag in the extracted bitstream to indicate that sub-picture information related to the subset of the sub-pictures is present in the extracted bitstream; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
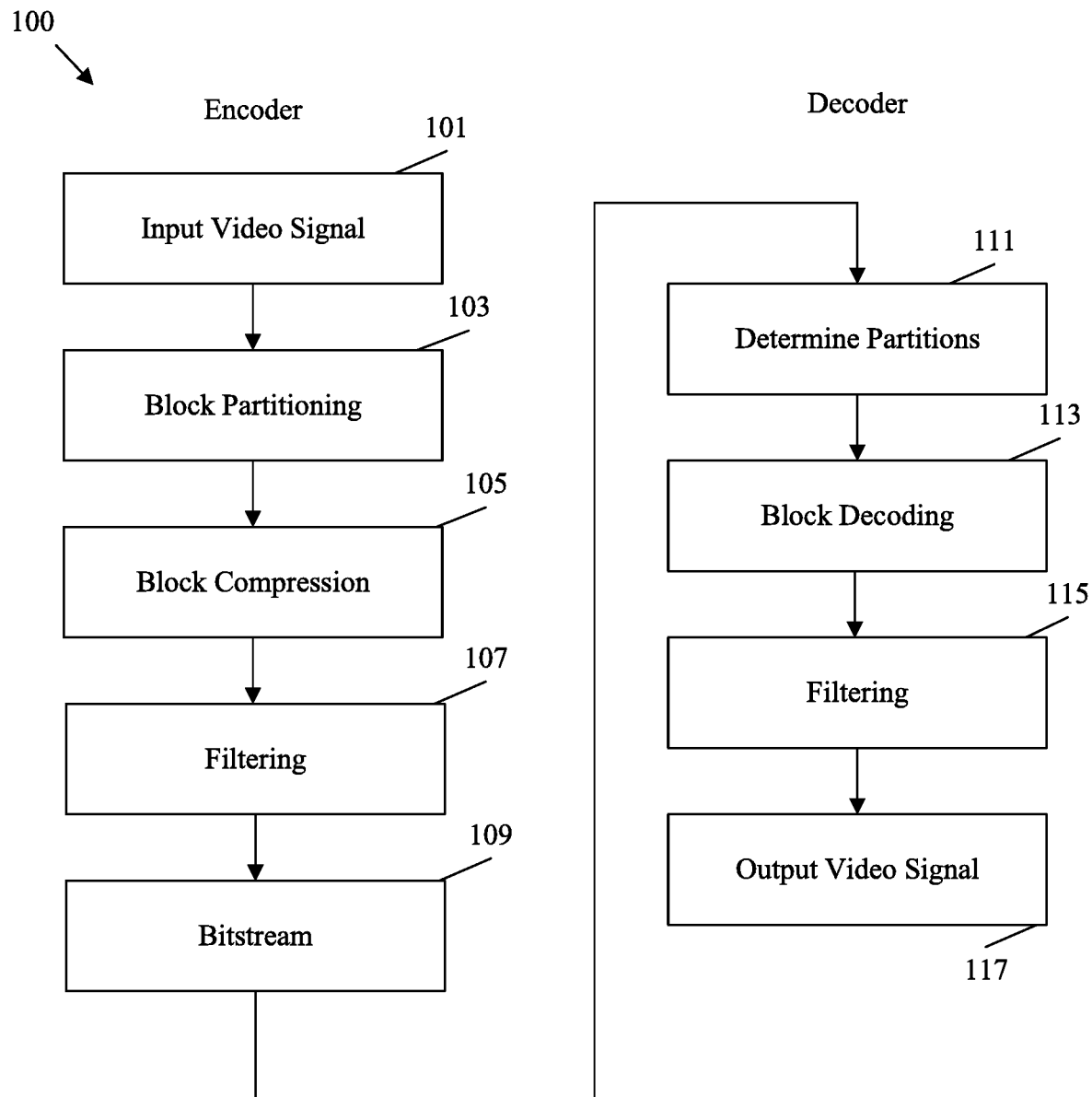
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A sub-picture is a rectangular region of one or more slices within a picture. A sub-bitstream extraction process is a specified mechanism that removes Network Abstraction Layer (NAL) units from a bitstream that are not a part of a target set resulting in an output sub-bitstream that includes the NAL units that are included in the target set. A NAL unit is a syntax structure containing bytes of data and an indication of the type of data contained therein. NAL units include video coding layer (VCL) NAL units that contain video data and non-VCL NAL units that contain supporting syntax data. An input bitstream is a bitstream that contains a complete set of NAL units prior to application of a sub-bitstream extraction process. An extracted bitstream, also known as a sub-bitstream, is a bitstream that is output from a bitstream extraction process and includes a sub-set of the NAL units from the input bitstream. A set is a collection of distinct items. A sub-set is a collection of items such that each item in the sub-set is included in the set and at least one item from the set is excluded from the sub-set. Sub-picture information is any data that describes a sub-picture. A flag is a data structure containing a sequence of bits that can be set to indicate corresponding data. A sub-picture identifier (ID) is a data item that uniquely identifies a corresponding sub-picture. A length of a data structure is a number of bits contained in the data structure. A coded layer video sequence (CLVS) is a sequence of encoded video data containing one or more layers of pictures. A CLVS may be referred to as a coded video sequence (CVS) when the CLVS contains a single layer or when the CLVS is discussed outside of a layer specific context. A sequence parameter set (SPS) is a parameter set that contains data related to a sequence of pictures. A decoded video sequence is a sequence of pictures that have been reconstructed by a decoder in preparation for display to a user.

The following acronyms are used herein, Coding Tree Block (CTB), Coding Tree Unit (CTU), Coding Unit (CU), Coded Video Sequence (CVS), Joint Video Experts Team (JVET), Motion-Constrained Tile Set (MCTS), Maximum Transfer Unit (MTU), Network Abstraction Layer (NAL), Picture Order Count (POC), Raw Byte Sequence Payload (RBSP), Sequence Parameter Set (SPS), Sub-Picture unit (SPU), Versatile Video Coding (VVC), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-N1001-v8.

Video coding sequences include a sequence of pictures. In some cases, such pictures can be further partitioned into a set of sub-pictures, where each sub-picture includes a separate region of a picture. Sub-pictures may allow different spatial portions of the picture to be treated differently at a decoder. For example, in a virtual reality (VR) context, only a portion of the entire picture is displayed to a user. Accordingly, sub-pictures can be used to transmit different portions of the picture to the decoder at different resolutions and/or even omit certain portions of the picture. This may increase coding efficiency. In another example, teleconferencing applications may dynamically increase the size and/or resolution of images of a participant that is actively speaking and decrease the size/resolution of the participant's image when the participant stops speaking. Including each participant in a different sub-picture allows for such dynamic changes related to one participant without impacting the images related to other participants. The sub-pictures may be associated with sub-picture IDs. A sub-picture ID uniquely identifies a corresponding sub-picture. Accordingly, sub-picture IDs can be used to indicate the location of a sub-picture relative to a picture and/or to make sub-picture level coding process changes. In some cases, sub-picture information, such as sub-picture IDs, can be inferred. For example, when a picture includes nine sub-pictures, the sub-picture IDs can be inferred by a decoder to be indices ranging from zero to eight. In such cases, this sub-picture information can be left out of the bitstream to increase coding efficiency.

However, certain processes may extract a sub-bitstream from a bitstream for independent transmission to an end user. In such a case, the sub-bitstream contains only a sub-set of the sub-pictures that were contained in the original bitstream. While the sub-picture information can be inferred when all sub-pictures are present, such inference may not be possible at a decoder when only a sub-set of the sub-pictures are present. As an example, the encoder may only transmit sub-picture three of nine and sub-picture four of nine to a decoder. If the sub-picture information is omitted, the decoder may not be able to determine which sub-pictures are being received and how such sub-pictures should be displayed. In such a case, the bitstream is considered to be a conforming bitstream because missing data pertaining to the bitstream can be inferred. However, the extracted sub-bitstream is not conforming because some missing data pertaining to the sub-bitstream cannot be inferred.

Disclosed herein are mechanisms to prevent coding errors during sub-bitstream extraction. Specifically, when a sub-bitstream is extracted from a bitstream, the encoder and/or splicer encode the sub-picture information for at least the sub-set of sub-pictures in the sub-bitstream into a parameter set in the sub-bitstream. Further, the encoder/splicer includes a flag to indicate that the sub-picture information is included in the sub-bitstream. The decoder can read this flag, obtain the correct sub-picture information, and decode the sub-bitstream. Such sub-picture information can include sub-picture IDs in a syntax element and a length data element indicating the bit length of the sub-picture ID syntax element. Accordingly, the disclosed mechanisms create additional functionality at the encoder and/or decoder by avoiding sub-picture related coding errors. Further, the disclosed mechanisms may increase coding efficiency by allowing for sub-bitstream extraction rather than transmitting the entire bitstream. This may reduce processor, memory, and/or network resource usage at the encoder and/or decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
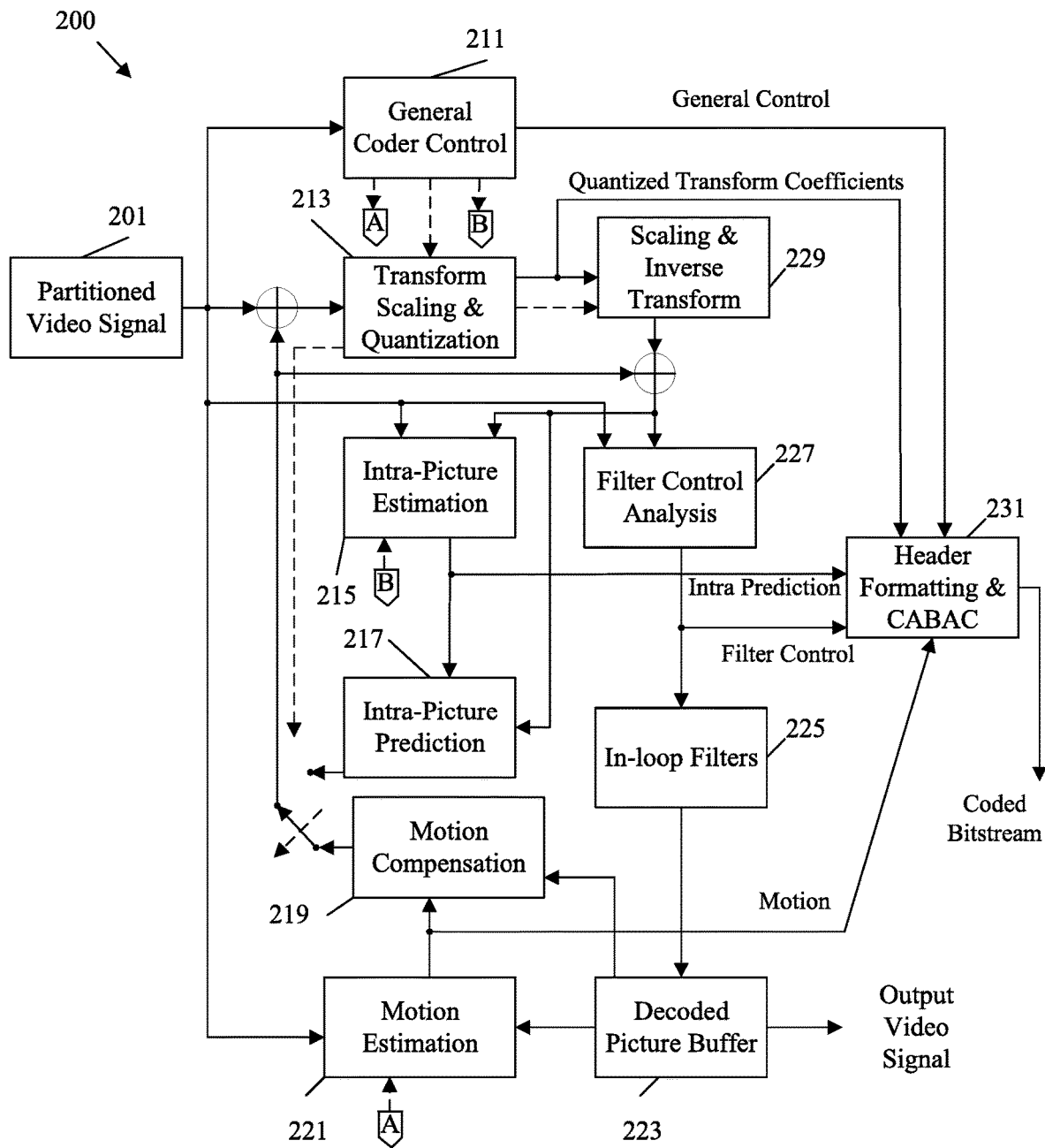
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
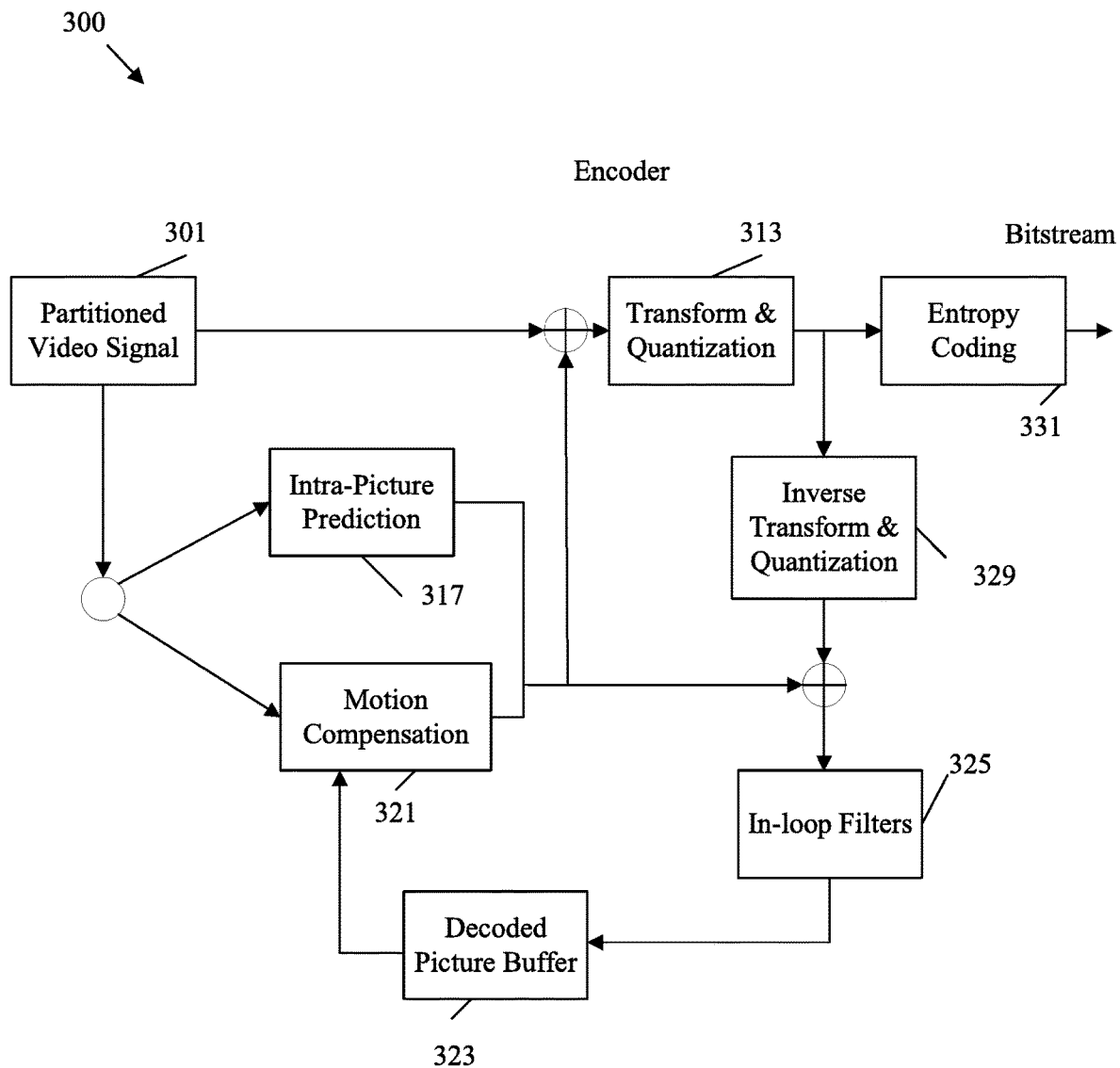
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream.

The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
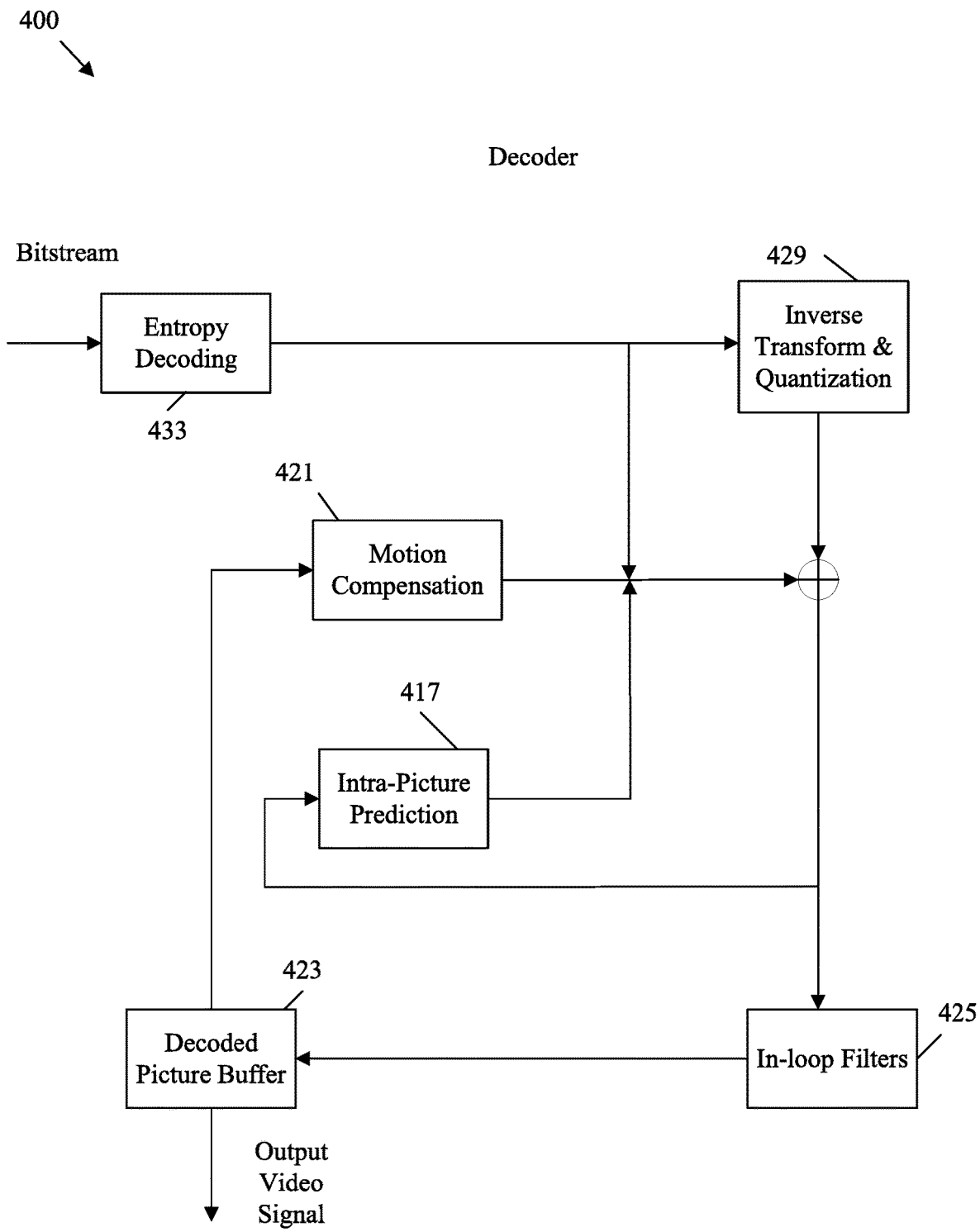
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
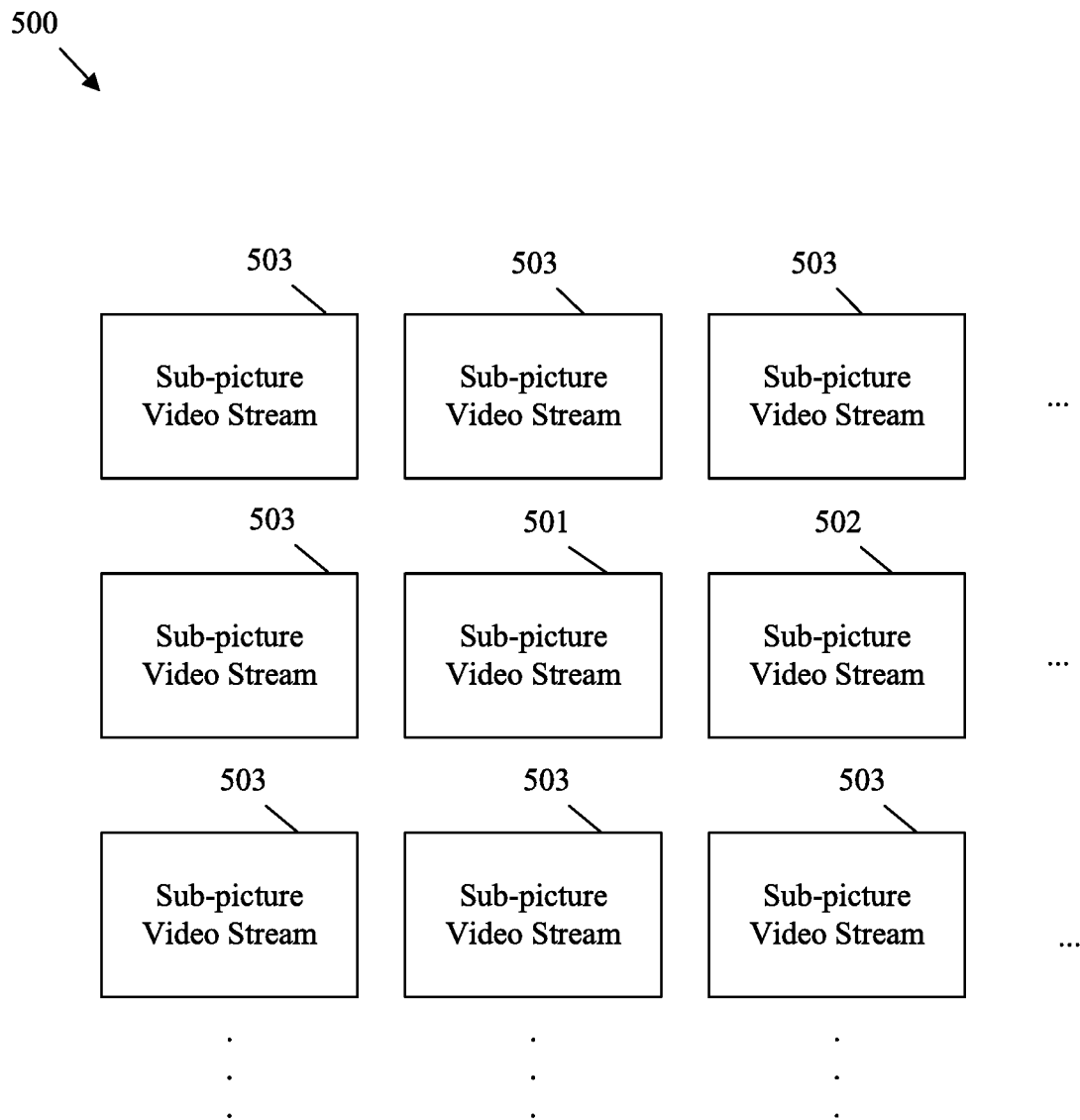
FIG. 5 is a schematic diagram illustrating a plurality of sub-picture video streams extracted from a picture video stream.

FIG. 5 is a schematic diagram illustrating a plurality of sub-picture video streams 501, 502, and 503 extracted from a picture video stream 500. For example, each of the sub-picture video streams 501-503 and/or the picture video stream 500 may be encoded by an encoder, such as codec system 200 and/or encoder 300, according to method 100. Further, the sub-picture video streams 501-503 and/or the picture video stream 500 may be decoded by a decoder, such as codec system 200 and/or decoder 400.

A picture video stream 500 includes a plurality of pictures presented over time. The picture video stream 500, as shown in FIG. 5, is configured for use in virtual reality (VR) application. VR operates by coding a sphere of video content, which can be displayed as if the user is in the center of the sphere. Each picture includes the entire sphere. Meanwhile, only a portion of the picture, known as a viewport, is displayed to the user. For example, the user may employ a head mounted display (HMD) that selects and displays a viewport of the sphere based on the user's head movement. This provides the impression of being physically present in a virtual space as depicted by the video. In order to accomplish this result, each picture of the video sequence includes an entire sphere of video data at a corresponding instant in time. However, only a small portion (e.g., a single viewport) of the picture is displayed to the user. The remainder of the picture is discarded at the decoder without being rendered. The entire picture may be transmitted so that a different viewport can be dynamically selected and displayed in response to the users head movement.

In the example shown, the pictures of the picture video stream 500 can each be sub-divided into sub-pictures based on available viewports. Accordingly, each picture and corresponding sub-picture includes a temporal position (e.g., picture order) as part of the temporal presentation. Sub-picture video streams 501-503 are created when the sub-division is applied consistently over time. Such consistent sub-division creates sub-picture video streams 501-503 where each stream contains a set of sub-pictures of a predetermined size, shape, and spatial position relative to corresponding pictures in the picture video stream 500. Further, the set of sub-pictures in a sub-picture video stream 501-503 varies in temporal position over the presentation time. As such, the sub-pictures of the sub-picture video streams 501-503 can be aligned in the time domain based on temporal position. Then the sub-pictures from the sub-picture video streams 501-503 at each temporal position can be merged in the spatial domain based on predefined spatial position to reconstruct the picture video stream 500 for display. Specifically, the sub-picture video streams 501-503 can each be encoded into separate sub-bitstreams. When such sub-bitstreams are merged together, they result in a bitstream that includes the entire set of pictures over time. The resulting bitstream can be transmitted toward the decoder for decoding and displayed based on the user's currently selected viewport.

One of the issues with VR video is that all of the sub-picture video streams 501-503 may be transmitted to a user at a high quality (e.g., high resolution). This allows the decoder to dynamically select the user's current viewport and display the sub-picture(s) from the corresponding sub-picture video streams 501-503 in real time. However, the user may only view a single viewport, for example from sub-picture video stream 501, while sub-picture video streams 502-503 are discarded. As such transmitting sub-picture video streams 502-503 at a high quality may use a significant amount of bandwidth without providing a corresponding benefit to the user. In order to improve coding efficiency, the VR video may be encoded into a plurality of video streams 500 where each video stream 500 is encoded at a different quality/resolution. In this way, the decoder can transmit a request for a current sub-picture video stream 501. In response, the encoder (or an intermediate slicer or other content server) can select the higher quality sub-picture video stream 501 from the higher quality video stream 500 and the lower quality sub-picture video streams 502-503 from the lower quality video stream 500. The encoder can then merge such sub-bitstreams together into a complete encoded bitstream for transmission to the decoder. In this way, the decoder receives a series of pictures where the current viewport is higher quality and the other viewports are lower quality. Further, the highest quality sub-pictures are generally displayed to the user (absent head movement) and the lower quality sub-pictures are generally discarded, which balances functionality with coding efficiency.

In the event that the user turns from viewing the sub-picture video stream 501 to the sub-picture video stream 502, the decoder requests the new current sub-picture video stream 502 be transmitted at the higher quality. The encoder can then alter the merging mechanism accordingly.

The picture video stream 500 is included to describe a practical application for sub-pictures. It should be noted that sub-pictures have many applications, and the present disclosure is not limited to VR technology. For example, sub-pictures may also be employed in teleconferencing systems. In such a case, each user's video feed is included in a sub-picture bitstream, such as sub-picture video stream 501, 502, and/or 503. The system can receive such a sub-picture video stream 501, 502, and/or 503 and combine them in different positions, resolutions, etc. to create a complete picture video stream 500 for transmission back to the user. This allows the teleconferencing system to dynamically change the picture video stream 500 based on changing user input, for example by increasing or decreasing the size of a sub-picture video stream 501, 502, and/or 503 to emphasis users that are currently speaking or de-emphasis users that are no longer speaking. Accordingly, sub-pictures have many applications that allow a picture video stream 500 to be dynamically altered at run-time based on changes in user behavior. This functionality may be achieved by extracting and/or combining sub-picture video stream 501, 502, and/or 503 from and/or into the picture video stream 500.

Figure 6:
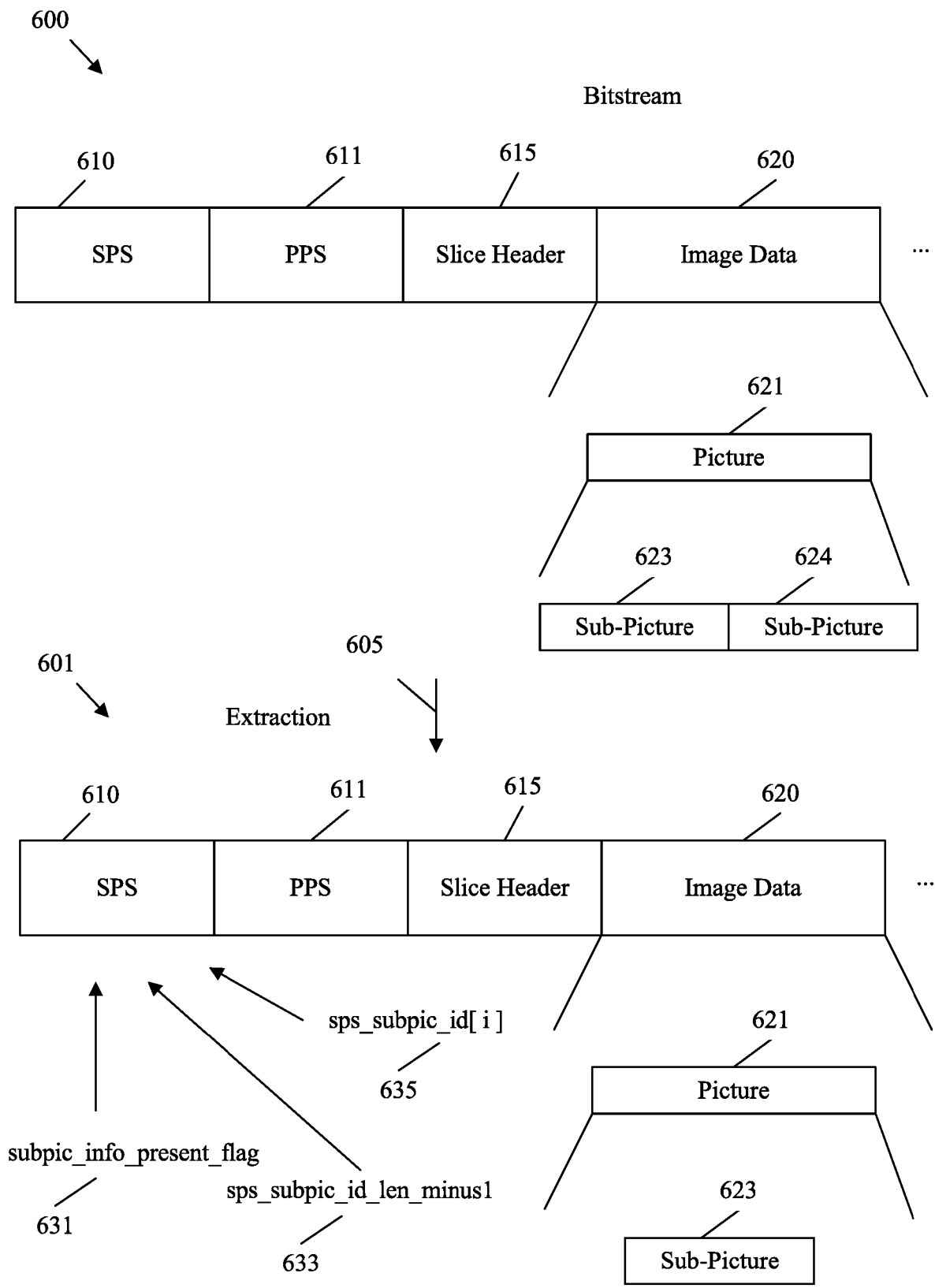
FIG. 6 is a schematic diagram illustrating an example bitstream split into a sub-bitstream.

FIG. 6 is a schematic diagram illustrating an example bitstream 600 split into a sub-bitstream 601. The bitstream 600 may contain a picture video stream, such as picture video stream 500, and the sub-bitstream 601 may contain a sub-picture video stream, such as sub-picture video stream 501, 502, and/or 503. For example, the bitstream 600 and the sub-bitstream 601 can be generated by a codec system 200 and/or an encoder 300 for decoding by a codec system 200 and/or a decoder 400. As another example, the bitstream 600 and the sub-bitstream 601 may be generated by an encoder at step 109 of method 100 for use by a decoder at step 111.

The bitstream 600 includes a sequence parameter set (SPS) 610, a plurality of picture parameter sets (PPSs) 611, a plurality of slice headers 615, and image data 620. An SPS 610 contains sequence data common to all the pictures in the video sequence contained in the bitstream 600. Such data can include picture sizing, bit depth, coding tool parameters, bit rate restrictions, etc. The PPS 611 contains parameters that apply to an entire picture. Hence, each picture in the video sequence may refer to a PPS 611. It should be noted that, while each picture refers to a PPS 611, a single PPS 611 can contain data for multiple pictures in some examples. For example, multiple similar pictures may be coded according to similar parameters. In such a case, a single PPS 611 may contain data for such similar pictures. The PPS 611 can indicate coding tools available for slices in corresponding pictures, quantization parameters, offsets, etc. The slice header 615 contains parameters that are specific to each slice in a picture. Hence, there may be one slice header 615 per slice in the video sequence. The slice header 615 may contain slice type information, picture order counts (POCs), reference picture lists, prediction weights, tile entry points, deblocking parameters, etc. It should be noted that a slice header 615 may also be referred to as a tile group header in some contexts. It should be noted that in some examples, a bitstream 600 may also include a picture header, which is a syntax structure that contains parameters that apply to all slices in a single picture. For this reason, a picture header and a slice header 615 may be used interchangeably in some contexts. For example, certain parameters may be moved between the slice header 615 and a picture header depending on whether such parameters are common to all slices in a picture.

The image data 620 contains video data encoded according to inter-prediction, intra-prediction, and/or inter-layer prediction as well as corresponding transformed and quantized residual data. For example, a video sequence includes a plurality of pictures 621. A picture 621 is an array of luma samples and/or an array of chroma samples that create a frame or a field thereof. A frame is a complete image that is intended for complete or partial display to a user at a corresponding instant in a video sequence. A picture 621 contains one or more slices. A slice may be defined as an integer number of complete tiles or an integer number of consecutive complete CTU rows (e.g., within a tile) of a picture 621 that are exclusively contained in a single NAL unit. The slices are further divided into CTUs and/or CTBs. A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

A picture 621 can be split into a plurality of sub-pictures 623 and 624. A sub-picture 623 and/or 624 is a rectangular region of one or more slices within a picture 621. Hence, each of the slices, and sub-divisions thereof, can be assigned to a sub-picture 623 and/or 624. This allows different regions of the picture 621 to be treated differently from a coding perspective depending on which sub-picture 623 and/or 624 is included in such regions.

A sub-bitstream 601 can be extracted from the bitstream 600 according to a sub-bitstream extraction process 605. A sub-bitstream extraction process 605 is a specified mechanism that removes NAL units from a bitstream that are not a part of a target set resulting in an output sub-bitstream that includes the NAL units that are included in the target set. A NAL unit contains a slice. As such, the sub-bitstream extraction process 605 retains a target set of slices and removes other slices. The target set can be selected based on sub-picture boundaries. In the example shown, the slices that are contained in the sub-picture 623 are included in the target set and the slices that are included in the sub-picture 624 are not included in the target set. As such, the sub-bitstream extraction process 605 creates a sub-bitstream 601 that is substantially similar to bitstream 600, but contains the sub-picture 623 while excluding the sub-picture 624. A sub-bitstream extraction process 605 may be performed by an encoder and/or an associated slicer configured to dynamically alter a bitstream 600 based on user behavior/requests.

Accordingly, the sub-bitstream 601 is an extracted bitstream that is a result of a sub-bitstream extraction process 605 applied to an input bitstream 600. The input bitstream 600 contains a set of sub-pictures. However, the extracted bitstream (e.g., sub-bitstream 601) contains only a subset of the sub-pictures of the input bitstream 600 to the sub-bitstream extraction process 605. In the example shown, the set of sub-pictures contained in the input bitstream 600 includes sub-pictures 623 and 624, while the sub-set of the sub-pictures in the sub-bitstream 601 includes sub-picture 623 but not sub-picture 624. It should be noted that any number of sub-pictures 623-624 can be employed. For example, the bitstream 600 may include N sub-pictures 623-624 and the sub-bitstream 601 may contain N−1 or fewer sub-pictures 623 where N is any integer value.

The sub-bitstream extraction process 605 may create coding errors in some cases. For example, the sub-pictures 623-624 may be associated with sub-picture information, such as sub-picture IDs. A sub-picture ID uniquely identifies a corresponding sub-picture, such as sub-picture 623 or 624. Accordingly, sub-picture IDs can be used to indicate the location of a sub-picture 623-624 relative to a picture 621 and/or to make sub-picture level coding process changes. In some cases sub-picture information can be inferred based on sub-picture 623-624 position. Accordingly, the bitstream 600 may omit such sub-picture information related to sub-pictures 623 and 624 to reduce the amount of data in the bitstream 600 in order to increase coding efficiency. However, a decoder may be unable to infer such sub-picture information when sub-picture 623 or sub-picture 624 is not present. As such, a simplistic sub-bitstream extraction process 605 may be applied to a conforming bitstream 600 and create a sub-bitstream 601 that is not conforming. A bitstream 600/sub-bitstream 601 is conforming when the bitstream 600/sub-bitstream 601 complies with a standard, such as VVC, and can therefore be correctly decoded by any decoder that also conforms to the standard. As such, a simplistic sub-bitstream extraction process 605 can convert a decodable bitstream 600 into a sub-bitstream 601 that is not decodable.

In order to address this issue, the present disclosure includes an improved sub-bitstream extraction process 605. Specifically, the sub-bitstream extraction process 605 encodes the sub-picture IDs for the sub-picture(s) 623 in the sub-bitstream 601 even when such sub-picture IDs are omitted from the bitstream 600. For example, the sub-picture IDs may be included in a SPS sub-picture identifier (sps_subpic_id[i]) syntax structure 635. The sps_subpic_id[i] syntax structure 635 is included in the SPS 610 and includes i sub-picture IDs, where i is the number of subpicture(s) 623 contained in the sub-bitstream 601. Further, the sub-bitstream extraction process 605 may also encode a length in bits of a syntax element (e.g., sps_subpic_id[i] syntax structure 635) containing the one or more sub-picture IDs into the extracted bitstream. For example, the length can be included in a SPS sub-picture ID length minus one (sps_subpic_id_len_minus1) syntax structure 633. The sps_subpic_id_len_minus1 syntax structure 633 may contain the length in bits of the sps_subpic_id[i] syntax structure 635 minus one. The minus one coding approach encodes a value as one less than the actual value in order to save bits. A decoder can derive the actual value by adding one. As such, the sps_subpic_id_len_minus1 syntax structure 633 may also be referred to as sps_subpic_id_len_minus1 plus 1. Accordingly, the decoder can use the sps_subpic_id_len_minus1 syntax structure 633 to determine the number of bits that are associated with the sps_subpic_id[i] syntax structure 635, and hence can use the sps_subpic_id_len_minus1 syntax structure 633 to interpret the sps_subpic_id[i] syntax structure 635. The decoder can then decode the sub-picture 623 based on the sps_subpic_id_len_minus1 syntax structure 633 and the sps_subpic_id[i] syntax structure 635.

In addition, the sub-bitstream extraction process 605 can encode/set a flag in the sub-bitstream 601 to indicate the sub-picture information related to the sub-picture 623 is present in the sub-bitstream 601. As a specific example, the flag can be encoded as a sub-picture information is present flag (subpic_info_present_flag) 631. As such, the subpic_info_present_flag 631 can be set to indicate that sub-picture information related to the subset of the sub-pictures, such as the sps_subpic_id_len_minus1 syntax structure 633 and the sps_subpic_id[i] syntax structure 635, is present in the extracted bitstream (sub-bitstream 601). Further, the decoder can read the subpic_info_present_flag 631 to determine that the sub-picture information related to the subset of the sub-pictures, such as the sps_subpic_id_len_minus1 syntax structure 633 and the sps_subpic_id[i] syntax structure 635, is present in the extracted bitstream (sub-bitstream 601). As a specific example, the encoder/slicer can require that the flag be set to one to specify that the subpicture information is present for a coded layer video sequence (CLVS) and that each picture 621 of the CLVS contains more than one sub-picture 623 and 624 when the extracted bitstream (sub-bitstream 601) is the result of the sub-bitstream extraction process 605 from the input bitstream 600. A CLVS is a sequence of encoded video data containing one or more layers of pictures. A layer is a set of NAL units that all have a particular layer ID value. Pictures 621 may or may not be organized into a plurality of layers where all pictures 621 of a corresponding layer have a similar characteristic, such as size, resolution, signal to noise ratio (SNR), etc.

The preceding information is now described in more detail herein below. HEVC may employ regular slices, dependent slices, tiles, and Wavefront Parallel Processing (WPP) as partitioning schemes. These partitioning schemes may be applied for Maximum Transfer Unit (MTU) size matching, parallel processing, and reduced end-to-end delay. Each regular slice may be encapsulated in a separate NAL unit. Entropy coding dependency and in-picture prediction, including intra-sample prediction, motion information prediction, and coding mode prediction, may be disabled across slice boundaries. Thus, a regular slice can be reconstructed independently from other regular slices within the same picture. However, slices may still have some interdependencies due to loop filtering operations.

Regular slice based parallelization may not require significant inter-processor or inter-core communication. One exception is that inter-processor and/or inter-core data sharing may be significant for motion compensation when decoding a predictively coded picture. Such a process may involve more processing resources than inter-processor or inter-core data sharing due to in-picture prediction. However, for the same reason, the use of regular slices can incur substantial coding overhead due to the bit cost of the slice header and due to the lack of prediction across the slice boundaries. Further, regular slices also serve as a mechanism for bitstream partitioning to match MTU size requirements due to the in-picture independence of regular slices and due to the fact that each regular slice is encapsulated in a separate NAL unit. In many cases, the goal of parallelization and the goal of MTU size matching place contradicting demands to the slice layout in a picture.

Dependent slices have short slice headers and allow partitioning of the bitstream at treeblock boundaries without breaking any in-picture prediction. Dependent slices provide fragmentation of regular slices into multiple NAL units. This provides reduced end-to-end delay by allowing a part of a regular slice to be transmitted before the encoding of the entire regular slice is finished.

In WPP, the picture is partitioned into single rows of CTBs. Entropy decoding and prediction may use data from CTBs in other partitions. Parallel processing is possible through parallel decoding of CTB rows. The start of the decoding of a CTB row may be delayed by one or two CTBs, depending on the example, to ensure that data related to a CTB above and to the right of the subject CTB is available before the subject CTB is decoded. This staggered start creates the appearance of a wavefront. This process supports parallelization with up to as many processors/cores as the picture contains CTB rows. Because in-picture prediction between neighboring treeblock rows within a picture is permitted, the inter-processor/inter-core communication to enable in-picture prediction can be substantial. The WPP partitioning does not result in the production of additional NAL units. Thus WPP may not be used for MTU size matching. However, if MTU size matching is required, regular slices can be used with WPP with certain coding overhead.

Tiles define horizontal and vertical boundaries that partition a picture into tile columns and rows. The scan order of CTBs may be local within a tile in the order of a CTB raster scan of a tile. Accordingly, a tile may be completely decoded before decoding the top-left CTB of the next tile in the order of tile raster scan of a picture. Similar to regular slices, tiles break in-picture prediction dependencies as well as entropy decoding dependencies. However, tiles may not be included into individual NAL units. Hence tiles may not be used for MTU size matching. Each tile can be processed by one processor/core. The inter-processor/inter-core communication employed for in-picture prediction between processing units decoding neighboring tiles may be limited to conveying a shared slice header when a slice includes more than one tile and loop filtering related sharing of reconstructed samples and metadata. When more than one tile or WPP segment is included in a slice, the entry point byte offset for each tile or WPP segment other than the first one in the slice may be signaled in the slice header.

For simplicity, HEVC employs certain restrictions on the application of the four different picture partitioning schemes. A coded video sequence may not include both tiles and wavefronts for most of the profiles specified in HEVC. Further, either or both of the following conditions must be fulfilled for each slice and/or tile. All coded treeblocks in a slice are included in the same tile. Further, all coded treeblocks in a tile are included in the same slice. In addition, a wavefront segment contains exactly one CTB row. When WPP is in use, a slice starting within a CTB row should end in the same CTB row.

In VVC, tiles define horizontal and vertical boundaries that partition a picture into tile columns and rows. VVC may allow a tile to be further split horizontally to form bricks. A tile that is not further split may also be considered to be a brick. The scan order of CTBs is changed to be local within a brick (e.g., in the order of a CTB raster scan of a brick). A current brick is completely decoded before decoding the top-left CTB of the next brick in the order of brick raster scan of a picture.

Slices in VVC may include one or more bricks. Each slice is encapsulated in a separate NAL unit. Entropy coding dependency and in-picture prediction, including intra-sample prediction, motion information prediction, and coding mode prediction, may be disabled across slice boundaries. Thus, a regular slice can be reconstructed independently from other regular slices within the same picture. VVC includes rectangular slices and raster-scan slices. A rectangular slice may comprise one or more bricks that occupy a rectangular region within a picture. A raster-scan slice may comprise one or more bricks that are in raster-scan order of bricks within a picture.

VVC based WPP is similar to HEVC WPP with the exception that HEVC WPP has a two CTU delay while VVC WPP has a one CTU delay. For HEVC WPP, a new decoding thread can start decoding the first CTU in an assigned CTU row after the first two CTUs in the previous CTU row have already been decoded. For VVC WPP, a new decoding thread can start decoding the first CTU in an assigned CTU row after the first CTU in the previous CTU row has been decoded.

An example signaling of tiles, bricks, and slices in a PPS is as follows.

| pic_parameter_set_rbsp( ) { | Descriptor |
|---|---|
| ... | |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     for( i = 0; brick_splitting_present_flag && i < NumTilesInPic; i++ ) { | |
|       brick_split_flag[ i ] | u(1) |
|       if( brick_split_flag[ i ] ) { | |
|         uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus1[ i ] | ue(v) |
|           for( j = 0; j < num_brick_rows_minus1[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       for( i = 0; i <= num_slices_in_pic_minus1; i++ ) { | |
|         if( i > 0 ) | |
|           top_left_brick_idx[ i ] | u(v) |
|         bottom_right_brick_idx_delta[ i ] | u(v) |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
|   } | |
|   if( rect_slice_flag ) { | |
|     signalled_slice_id_flag | u(1) |
|     if( signalled_slice_id_flag ) { | |
|       signalled_slice_id_length_minus1 | ue(v) |
|       for( i = 0; i <= num_slices_in_pic_minus1; i++) | |
|         slice_id[ i ] | u(v) |
|     } | |
|   } | |
|   ... | |
| } | |

The preceding systems have certain problems. For example, when a bitstream is first encoded slices in pictures in the bitstream may be partitioned into rectangular slices. In this case, slice IDs may be omitted from the PPS. In this case, the value of signalled_slice_id_flag may be set equal to zero in PPSs of the bitstream. However, when one or more rectangular slices from the bitstream are extracted to form another bitstream, slice IDs should be present in the PPS in the bitstream generated from such an extraction process.

In general, this disclosure describes handing signaled slice IDs for aiding the bitstream extraction process. The description of the techniques is based on VVC, but may also apply to other video codec specifications.

An example mechanism to address the problems listed above is as follows. A method for extracting one or more slices from pictures of a bitstream denoted as bitstreamA and producing a new bitstream bitstreamB from the extraction process is disclosed. The bitstreamA comprises at least one picture. The picture comprises a plurality of slices. The method comprises parsing a parameter set from bitstreamA and rewriting the parameter into bitstreamB. The value of signalled_slice_id_flag is set to one in the rewritten parameter set. When the signalled_slice_id_length_minus1 syntax element is present in the bitstreamA's parameter set, the value for the signalled_slice_id_flag is copied into the rewritten parameter set. When the signalled_slice_id_length_minus1 syntax element is not present in the bitstreamA's parameter set, the value of the signalled_slice_id_flag is set in the rewritten parameter set. For example, the signalled_slice_id_flag may be set to Ceil(Log 2(num_slices_in_pic_minus1+1))−1 where num_slices_in_pic_minus1 is equal to the number of slices in the picture of the bitstreamA minus one. One or more slices are extracted from bitstreamA. Extracted bitstreamB is then generated.

An example PPS semantics are as follows. A signalled_slice_id_flag set to one may specify that the slice ID for each slice is signaled. A signalled_slice_id_flag set to zero may specify that slice IDs are not signaled. When rect_slice_flag is equal to zero, the value of signalled_slice_id_flag may be inferred to be equal to zero. For a bitstream that is a result of a sub-bitstream extraction, and the result contains a subset of the slices originally included in the pictures, the value of signalled_slice_id_flag should be set equal to one for the PPSs. A signalled_slice_id_length_minus1 plus one may specify the number of bits used to represent the syntax element slice id[ i ] when present, and the syntax element slice_address in slice headers. The value of signalled_slice_id_length_minus1 may be in the range of zero to fifteen, inclusive. When not present, the value of signalled_slice_id_length_minus1 may be inferred to be equal to Ceil(Log 2(num_slices_in_pic_minus1+1))−1. For a bitstream that is a result of a sub-bitstream extraction, and the result contains a subset of the slices originally included in the pictures, the value of signalled_slice_id_length_minus1 for the PPSs should remain unchanged.

Figure 7:
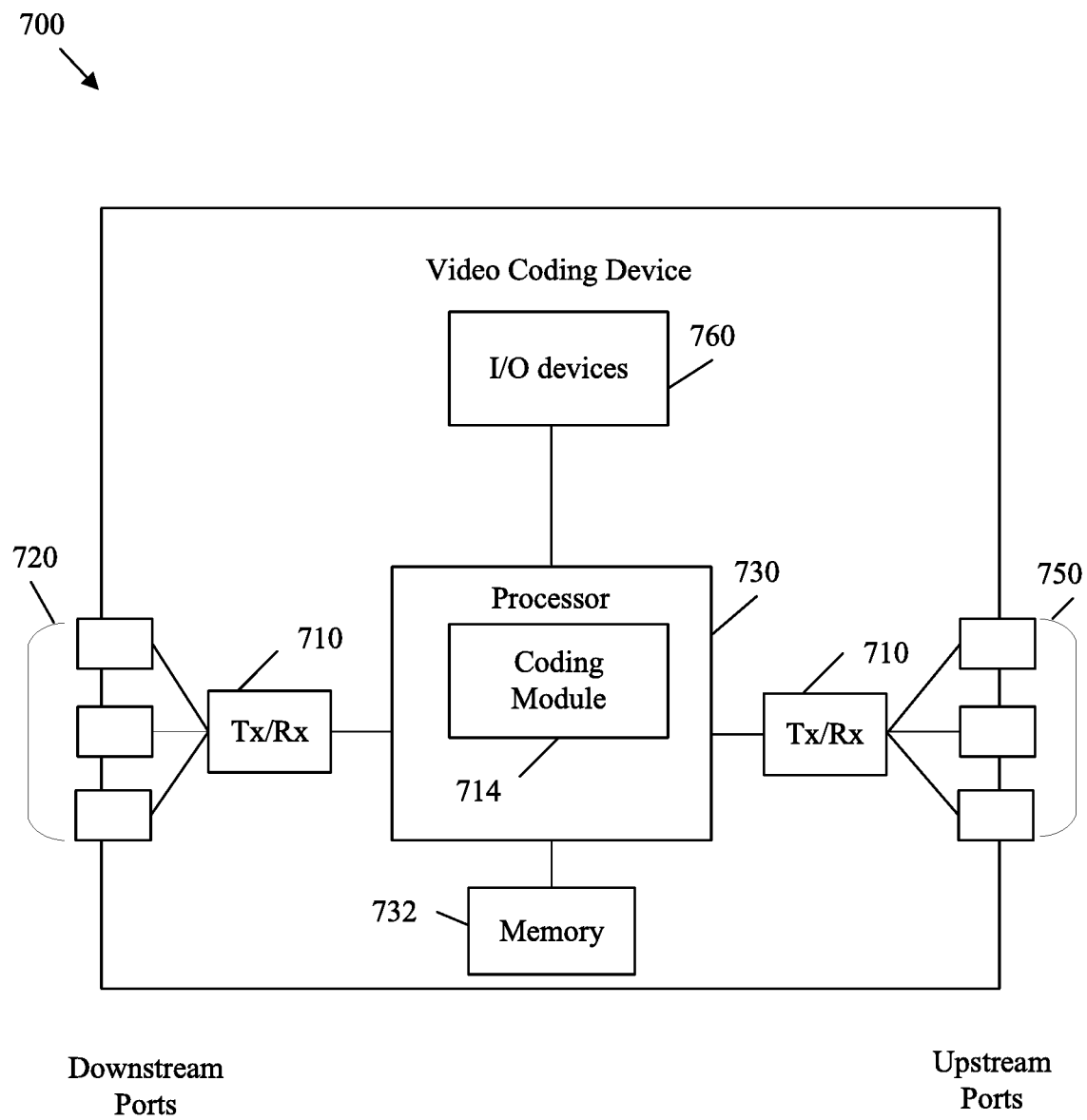
FIG. 7 is a schematic diagram of an example video coding device.

FIG. 7 is a schematic diagram of an example video coding device 700. The video coding device 700 is suitable for implementing the disclosed examples/embodiments as described herein. The video coding device 700 comprises downstream ports 720, upstream ports 750, and/or transceiver units (Tx/Rx) 710, including transmitters and/or receivers for communicating data upstream and/or downstream over a network. The video coding device 700 also includes a processor 730 including a logic unit and/or central processing unit (CPU) to process the data and a memory 732 for storing the data. The video coding device 700 may also comprise electrical, optical-to-electrical (OE) components, electrical-to-optical (EO) components, and/or wireless communication components coupled to the upstream ports 750 and/or downstream ports 720 for communication of data via electrical, optical, or wireless communication networks. The video coding device 700 may also include input and/or output (I/O) devices 760 for communicating data to and from a user. The I/O devices 760 may include output devices such as a display for displaying video data, speakers for outputting audio data, etc. The I/O devices 760 may also include input devices, such as a keyboard, mouse, trackball, etc., and/or corresponding interfaces for interacting with such output devices.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the downstream ports 720, Tx/Rx 710, upstream ports 750, and memory 732. The processor 730 comprises a coding module 714. The coding module 714 implements the disclosed embodiments described herein, such as methods 100, 800, and/or 900, which may employ a bitstream 600 and/or sub-bitstream 601 including a picture video stream 500 and/or sub-picture video streams 501-503. The coding module 714 may also implement any other method/mechanism described herein. Further, the coding module 714 may implement a codec system 200, an encoder 300, and/or a decoder 400. For example, the coding module 714 can be employed extract a sub-bitstream from a bitstream, include sub-picture information in the sub-bitstream during the extraction process, and/or include a flag in the sub-bitstream to indicate that the sub-picture information is included in the sub-bitstream. Hence, the coding module 714 causes the video coding device 700 to provide additional functionality and/or coding efficiency when coding video data. As such, the coding module 714 improves the functionality of the video coding device 700 as well as addresses problems that are specific to the video coding arts. Further, the coding module 714 effects a transformation of the video coding device 700 to a different state. Alternatively, the coding module 714 can be implemented as instructions stored in the memory 732 and executed by the processor 730 (e.g., as a computer program product stored on a non-transitory medium).

The memory 732 comprises one or more memory types such as disks, tape drives, solid-state drives, read only memory (ROM), random access memory (RAM), flash memory, ternary content-addressable memory (TCAM), static random-access memory (SRAM), etc. The memory 732 may be used as an over-flow data storage device, to store programs when such programs are selected for execution, and to store instructions and data that are read during program execution.

Figure 8:
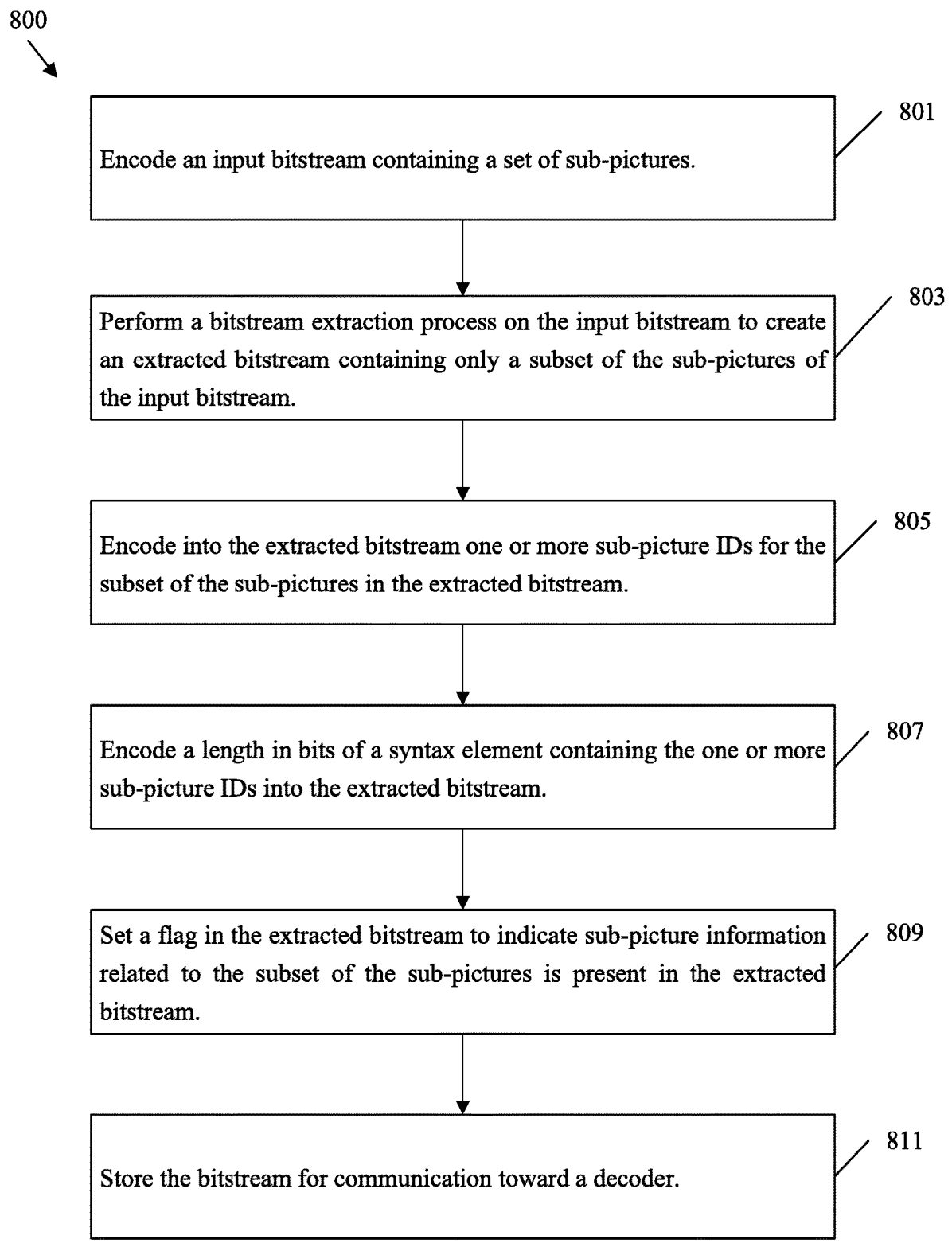
FIG. 8 is a flowchart of an example method of encoding a video sequence into a bitstream and extracting a sub-bitstream while mitigating ID errors.

FIG. 8 is a flowchart of an example method 800 of encoding a video sequence into a bitstream, such as bitstream 600, and extracting a sub-bitstream, such as sub-bitstream 601, while mitigating ID errors. Method 800 can be employed by an encoder, such as a codec system 200, an encoder 300, and/or a video coding device 700 when performing method 100 to encode a picture video stream 500 and/or sub-picture video streams 501-503.

Method 800 may begin when an encoder receives a video sequence including a plurality of pictures and determines to encode that video sequence into a bitstream, for example based on user input. At step 801, the encoder encodes an input bitstream, such as picture video stream 500 and/or bitstream 600, containing a set of sub-pictures. For example, the bitstream may contain VR video data and/or teleconferencing video data. The set of sub-pictures may contain a plurality of sub-pictures. Further, the sub-pictures may be associated with sub-picture IDs.

At step 803, the encoder and/or an associated slicer performs a sub-bitstream extraction process on the input bitstream to create an extracted bitstream, such as sub-picture video streams 501-503 and/or sub-bitstream 601. The extracted bitstream contains only a subset of the sub-pictures of the input bitstream. Specifically, the extracted bitstream contains only the sub-pictures included in the set of sub-pictures in the input bitstream. Further, the extracted bitstream excludes one or more of the sub-pictures from the set of sub-pictures in the input bitstream. As such, the input bitstream may contain a CLVS of pictures and the extracted bitstream contains a CLVS of sub-pictures of the pictures.

At step 805, the encoder encodes, into the extracted bitstream, one or more sub-picture IDs for the subset of the sub-pictures in the extracted bitstream. For example, such sub-picture IDs may be excluded from the input bitstream. Accordingly, the encoder may encode such sub-picture IDs into the extracted bitstream to support decoding of the sub-pictures contained in the extracted bitstream. For example, the sub-picture IDs may be contained in/encoded into a sps_subpic_id[i] syntax structure in the extracted bitstream.

At step 807, the encoder encodes a length in bits of a syntax element containing the one or more sub-picture IDs into the extracted bitstream. For example, the length of the sub-picture IDs may be excluded from the input bitstream. Accordingly, the encoder may encode the length of the sub-picture IDs into the extracted bitstream to support decoding of the sub-pictures contained in the extracted bitstream. For example, the length may be contained in/encoded into a sps_subpic_id_len_minus1 plus 1 syntax structure in the extracted bitstream.

At step 809, the encoder can set a flag in the extracted bitstream to indicate sub-picture information related to the subset of the sub-pictures is present in the extracted bitstream. The flag may indicate to the decoder that the sub-picture IDs and/or the length of the sub-picture IDs are present in the extracted bitstream. For example, the flag may be a subpic_info_present_flag. In a specific example, the flag is required to be set to one to specify that the sub-picture information is present for a CLVS (e.g., contained in the input bitstream and/or the extracted bitstream) and that each picture of the CLVS contains more than one sub-picture when the extracted bitstream is the result of the sub-bitstream extraction process from the input bitstream. In some examples, the flag, the sub-picture IDs, and the length are encoded into a SPS in the extracted bitstream.

At step 811, the encoder stores the bitstream for communication toward a decoder. The bitstream can then be transmitted to the decoder, in some examples. For example the bitstream may be transmitted to the decoder upon request by the decoder, for example based on a user request.

Figure 9:
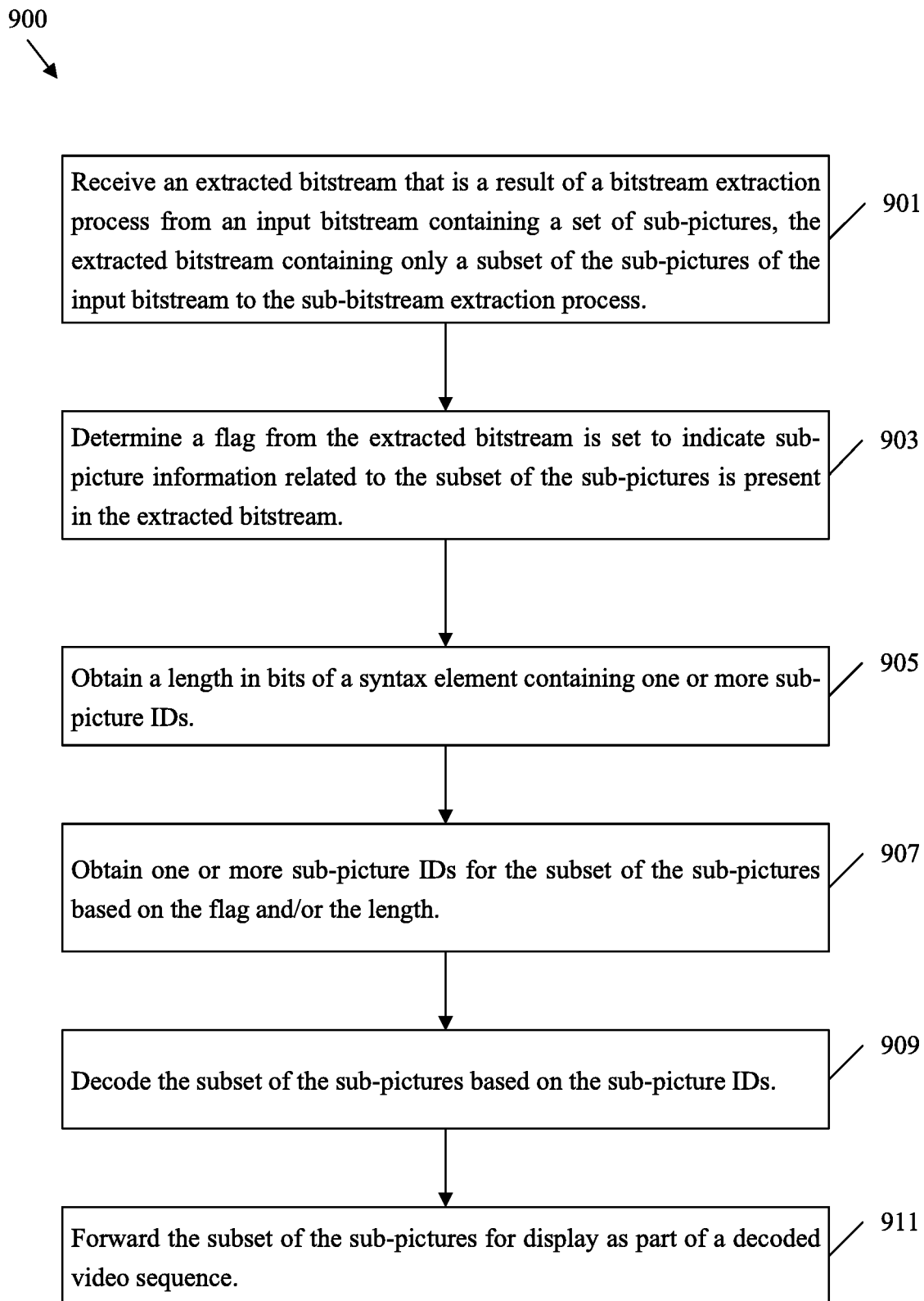
FIG. 9 is a flowchart of an example method of decoding a video sequence from a sub-bitstream extracted from a bitstream.

FIG. 9 is a flowchart of an example method 900 of decoding a video sequence from a sub-bitstream, such as sub-bitstream 601, extracted from a bitstream, such as bitstream 600. Method 900 can be employed by a decoder, such as a codec system 200, a decoder 400, and/or a video coding device 700 when performing method 100 to decode a picture video stream 500 and/or sub-picture video streams 501-503.

Method 900 may begin when a decoder begins receiving a sub-bitstream extracted from a bitstream, for example as a result of method 800. At step 901, the decoder receives an extracted bitstream. The extracted bitstream is a result of a sub-bitstream extraction process from an input bitstream containing a set of sub-pictures. The extracted bitstream contains only a subset of the sub-pictures of the input bitstream to the sub-bitstream extraction process. Specifically, the extracted bitstream contains only sub-pictures included in the set of sub-pictures in the input bitstream. Further, the extracted bitstream excludes one or more of the sub-pictures from the set of sub-pictures in the input bitstream. As such, the input bitstream may contain a CLVS of pictures and the extracted bitstream may contain a CLVS of sub-pictures of the pictures. The received extracted bitstream may also be referred to as a sub-bitstream. For example, the extracted bitstream may contain sub-picture(s) including VR video data and/or teleconferencing video data.

At step 903, the decoder determines a flag from the extracted bitstream is set to indicate sub-picture information related to the subset of the sub-pictures is present in the extracted bitstream. The flag may indicate that sub-picture IDs and/or a length of the sub-picture IDs are present in the extracted bitstream. For example, the flag may be a subpic_info_present_flag. In a specific example, the flag is required to be set to one to specify that the sub-picture information is present for a CLVS (e.g., contained in the input bitstream and/or the extracted bitstream) and that each picture of the CLVS contains more than one sub-picture when the extracted bitstream is the result of the sub-bitstream extraction process from the input bitstream.

At step 905, the decoder obtains a length in bits of a syntax element containing one or more sub-picture IDs. For example, the length of the sub-picture IDs may be excluded from the input bitstream, but included in the extracted bitstream. For example, the length may be contained in/encoded into a sps_subpic_id_len_minus1 plus 1 syntax structure in the received extracted bitstream.

At step 907, the decoder obtains one or more sub-picture IDs for the subset of the sub-pictures based on the flag and/or based on the length. For example, the decoder can employ the flag to determine that the sub-picture IDs are present. The decoder can then employ the length to determine the boundaries of the sub-picture ID data in the bitstream. For example, the sub-picture IDs may be excluded from the input bitstream, but included in the extracted bitstream. For example, the sub-picture IDs may be contained in/encoded into a sps_subpic_id[i] syntax structure in the extracted bitstream. In some examples, the flag, the sub-picture IDs, and the length are obtained from a SPS in the extracted bitstream.

At step 909, the decoder can decode the subset of the sub-pictures in the extracted bitstream based on the sub-picture IDs obtained at step 907. The decoder can then forward the subset of the sub-pictures for display as part of a decoded video sequence at step 911.

Figure 10:
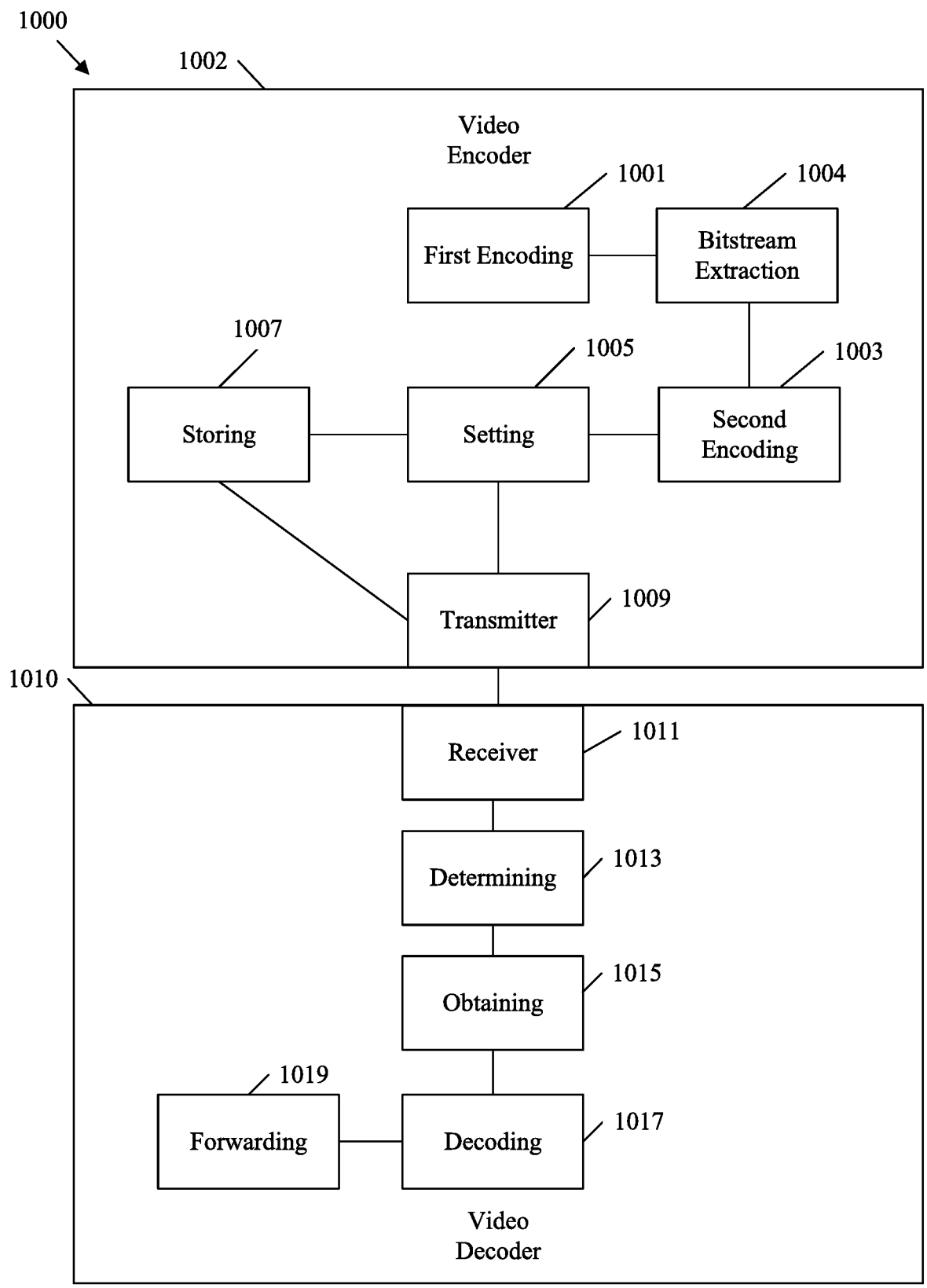
FIG. 10 is a schematic diagram of an example system for coding a video sequence of images in a bitstream and extracting a sub-bitstream while mitigating ID errors.

FIG. 10 is a schematic diagram of an example system 1000 for coding a video sequence of images in a bitstream, such as bitstream 600, and extracting a sub-bitstream, such as sub-bitstream 601, while mitigating ID errors. Accordingly, system 1000 may be employed to code a picture video stream 500 and/or sub-picture video streams 501-503. System 1000 may be implemented by an encoder and a decoder such as a codec system 200, an encoder 300, a decoder 400, and/or a video coding device 700. Further, system 1000 may be employed when implementing method 100, 800, and/or 900.

The system 1000 includes a video encoder 1002. The video encoder 1002 comprises a first encoding module 1001 for encoding an input bitstream containing a set of sub-pictures. The video encoder 1002 further comprises a bitstream extraction module 1004 for performing a sub-bitstream extraction process on the input bitstream to create an extracted bitstream containing only a subset of the sub-pictures of the input bitstream. The video encoder 1002 further comprises a second encoding module 1003 for encoding into the extracted bitstream one or more sub-picture IDs for the subset of the sub-pictures in the extracted bitstream. The video encoder 1002 further comprises a setting module 1005 for setting a flag in the extracted bitstream to indicate sub-picture information related to the subset of the sub-pictures is present in the extracted bitstream. The video encoder 1002 further comprises a storing module 1007 for storing the bitstream for communication toward a decoder. The video encoder 1002 further comprises a transmitting module 1009 for transmitting the bitstream toward video decoder 1010. The video encoder 1002 may be further configured to perform any of the steps of method 800.

The system 1000 also includes a video decoder 1010. The video decoder 1010 comprises a receiving module 1011 for receiving an extracted bitstream that is a result of a sub-bitstream extraction process from an input bitstream containing a set of sub-pictures, the extracted bitstream containing only a subset of the sub-pictures of the input bitstream to the sub-bitstream extraction process. The video decoder 1010 further comprises a determining module 1013 for determining a flag from the extracted bitstream is set to indicate sub-picture information related to the subset of the sub-pictures is present in the extracted bitstream. The video decoder 1010 further comprises an obtaining module 1015 for obtaining one or more sub-picture IDs for the subset of the sub-pictures based on the flag. The video decoder 1010 further comprises a decoding module 1017 for decoding the subset of the sub-pictures based on the sub-picture IDs. The video decoder 1010 further comprises a forwarding module 1019 for forwarding the subset of the sub-pictures for display as part of a decoded video sequence. The video decoder 1010 may be further configured to perform any of the steps of method 900.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
   receiving a bitstream that is a result of a sub-picture sub-bitstream extraction process from an input bitstream, the bitstream containing a picture parameter set (PPS) and only a subset of sub-pictures of the input bitstream to the sub-picture sub-bitstream extraction process;
   determining a plurality of flags from the bitstream are set to specify that sub-picture information is present in the bitstream, wherein one of the flags is equal to one when slice identifiers (IDs) of a plurality of slices are signaled in the PPS and equal to zero when slice IDs of the plurality of slices are not signaled in the PPS;
   obtaining one or more sub-picture identifiers (IDs) for the subset of the sub-pictures based on the flags; and
   decoding the subset of the sub-pictures based on the sub-picture IDs.

2. The method of claim 1, further comprising obtaining a length in bits of a syntax element containing the one or more sub-picture IDs.

3. The method of claim 2, wherein the flags, the sub-picture IDs, and the length are obtained from a sequence parameter set (SPS) in the bitstream.

4. The method of claim 3, wherein one of the flags is a sub-picture information is present flag (subpic_info_present_flag).

5. The method of claim 3, wherein the sub-picture IDs are contained in a SPS sub-picture identifier (sps_subpic_id[i]) syntax element.

6. The method of claim 3, wherein the length is contained in a SPS sub-picture ID length minus one plus one (sps_subpic_id_len_minus1 plus 1) syntax element.

7. The method of claim 1, wherein the flag one of the flags is set to one to specify that the sub-picture information is present for a coded layer video sequence (CLVS) and that each picture of the CLVS contains more than one sub-picture.

8. A method implemented by an encoder, the method comprising:
   encoding an input bitstream containing a set of sub-pictures and a picture parameter set (PPS);
   performing a sub-picture sub-bitstream extraction process on the input bitstream to create an extracted bitstream containing the PPS and only a subset of the sub-pictures of the input bitstream;
   encoding, into the extracted bitstream, one or more sub-picture identifiers (IDs) for the subset of the sub-pictures in the extracted bitstream;
   setting a plurality of flags in the extracted bitstream to indicate that sub-picture information related to the subset of the sub-pictures is present in the extracted bitstream, wherein the one of the flags is equal to one when slice identifiers (IDs) of a plurality of slices are signaled in the PPS and equal to zero when slice IDs of the plurality of slices are not signaled in the PPS; and storing the extracted bitstream for communication toward a decoder.

9. The method of claim 8, further comprising encoding a length in bits of a syntax element containing the one or more sub-picture IDs into the extracted bitstream.

10. The method of claim 9, wherein the flags, the sub-picture IDs, and the length are encoded into a sequence parameter set (SPS) in the extracted bitstream.

11. The method of claim 10, wherein one of the flags is a sub-picture information is present flag (subpic_info_present_flag).

12. The method of claim 10, wherein the sub-picture IDs are contained in a SPS sub-picture identifier (sps_subpic_id[i]) syntax structure.

13. The method of claim 10, wherein the length is contained in a SPS sub-picture ID length minus one plus one (sps_subpic_id_len_minus1 plus 1) syntax structure.

14. The method of claim 8, wherein the flag one of the flags is required to be set to one to specify that the sub-picture information is present for a coded layer video sequence (CLVS) and that each picture of the CLVS contains more than one sub-picture when the extracted bitstream is a result of the sub-picture sub-bitstream extraction process from the input bitstream.

15. A video coding device comprising:
a processor configured to:
receive a bitstream that is a result of a sub-picture sub-bitstream extraction process from an input bitstream, the bitstream containing a picture parameter set (PPS) and only a subset of sub-pictures of the input bitstream to the sub-picture sub-bitstream extraction process;
determine a plurality of flags from the bitstream is set are set to specify that sub-picture information is present in the bitstream, wherein one of the flags is equal to one when slice identifiers (IDs) of a plurality of slices are signaled in the PPS and equal to zero when slice IDs of the plurality of slices are not signaled in the PPS;
obtain one or more sub-picture identifiers (IDs) for the subset of the sub-pictures based on the flags; and
decode the subset of the sub-pictures based on the sub-picture IDs.

16. The video coding device of claim 15, wherein the processor is further configured to obtain a length in bits of a syntax element containing the one or more sub-picture IDs.

17. The video coding device of claim 16, wherein the flags, the sub-picture IDs, and the length are obtained from a sequence parameter set (SPS) in the bitstream.

18. The video coding device of claim 17, wherein the flag one of the flags is a sub-picture information is present flag (subpic_info_present_flag).

19. The video coding device of claim 17, wherein the sub-picture IDs are contained in a SPS sub-picture identifier (sps_subpic_id[i]) syntax element.

20. The video coding device of claim 17, wherein the length is contained in a SPS sub-picture ID length minus one plus one (sps_subpic_id_len_minus1 plus 1) syntax element.

* * * * *

UNITED STATES PATENT AND TRADEMARK OFFICE
CERTIFICATE OF CORRECTION

PATENT NO. : 11,968,400 B2
APPLICATION NO. : 17/568531
DATED : April 23, 2024
INVENTOR(S) : Ye-Kui Wang et al.

It is certified that error appears in the above-identified patent and that said Letters Patent is hereby corrected as shown below:

On the Title Page

Page 2, Other Publications, Column 2, Line 33:
Delete "Chen et al., "AHG17: [SYS-VVC] Signalling subpicture coded video sequence," Joint Video Experts Team (JVET) of ITU-T SG 16 WP 3 and ISO/IEC JTC 1/SC 29/WG 11, 14th Meeting: Gothenburg, SE, JVET-O0454, Jul. 3-12, 2019, 5 pages." and insert -- Chen et al., "AHG17: [SYS-VVC] Signalling subpicture coded video sequence," Joint Video Experts Team (JVET) of ITU-T SG 16 WP 3 and ISO/IEC JTC 1/SC 29/WG 11, 14th Meeting: Geneva, Switzerland, JVET-N0073-v1, Mar. 19-27, 2019, 7 pages. --

In the Claims

Column 31, Claim 14, Lines 22-27, should read:
14. The method of claim 8, wherein one of the flags is required to be set to one to specify that the sub-picture information is present for a coded layer video sequence (CLVS) and that each picture of the CLVS contains more than one sub-picture when the extracted bitstream is a result of the sub-picture sub-bitstream extraction process from the input bitstream.

Column 31, Claim 15, Lines 28-31, through Column 32, Lines 1-15, should read:
15. A video coding device comprising:
    a processor configured to:
        receive a bitstream that is a result of a sub-picture sub-bitstream extraction process from an input bitstream, the bitstream containing a picture parameter set (PPS) and only a subset of sub-pictures of the input bitstream to the sub-picture sub-bitstream extraction process;
        determine a plurality of flags from the bitstream are set to specify that sub-picture information is present in the bitstream, wherein one of the flags is equal to one when slice identifiers (IDs) of a plurality of slices are signaled in the PPS and equal to zero when slice IDs of the plurality of slices are not signaled in the PPS;
        obtain one or more sub-picture identifiers (IDs) for the subset of the sub-pictures based on the flags; and Signed and Sealed this
Fourth Day of June, 2024

Katherine Kelly Vidal
*Director of the United States Patent and Trademark Office* decode the subset of the sub-pictures based on the sub-picture IDs.

Column 32, Claim 18, Lines 22-24, should read:
18. The video coding device of claim 17, wherein one of the flags is a sub-picture information is present flag (subpic_info_present_flag).